Patented Sept. 7, 1943

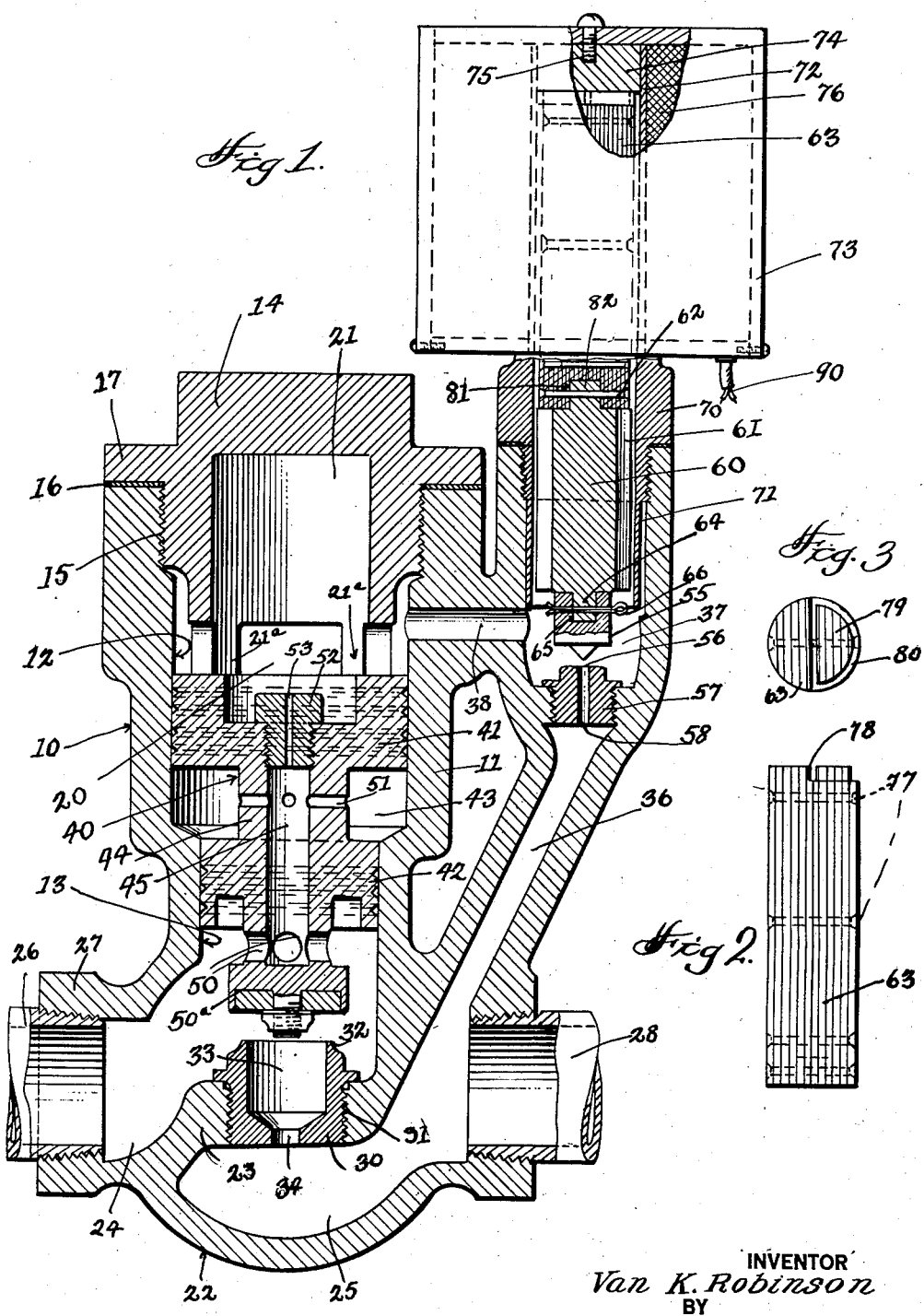

2,329,001

UNITED STATES PATENT OFFICE 2,329,001

PILOT OPERATED VALVE

Van King Robinson, Bremerton, Wash., assignor of one-half to Randolph B. Delmore, Bremerton, Wash.

Application November 25, 1941, Serial No. 420,418

1 Claim. (Cl. 137—139)

This invention relates to pilot operated valves.

An object of the invention is the provision of a valve construction having few moving parts which are less susceptible to damage by wear or accident, and which facilitates repairs and replacement when such become necessary, the valve being of such construction that it will not require factory facilities to make repairs.

Another object of the invention is the provision of a valve operated by a piston having differential areas with the greatest effective pressure area being located at the outer end of the piston so that the valve which is connected to the piston will be maintained closed until a discharge passage is opened by a pilot valve for reducing pressure on the outer end of the piston.

A further object of the invention is the provision of a valve which is operated by a piston having a greater effective pressure area at one end for maintaining the valve closed until a discharge passage is opened by a pilot valve to relieve pressure on the larger surface area of the piston, the pilot valve being operated by a solenoid in a circuit which is either manually or automatically controlled the solenoid being particularly constructed so that the pilot valve will be efficiently operated at all times.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a vertical section of a valve constructed in accordance with the principles of my invention.

Figure 2 is a view in elevation of a core of a solenoid for operating a pilot valve.

Figure 3 is a plan view of the core shown in Fig. 2.

Referring more particularly to the drawing, 10 generally designates a valve body which includes a cylinder 11 having a section 12 provided with a larger diameter than the section 13. The outer end of the cylinder 11 is closed by a plug 14 which is screwed into a threaded portion 15 of the outer end of the cylinder 11. A gasket 16 is located between the annular flange 17 of the plug 14 and the outer end of the cylinder.

The outer end of the cylinder is provided with a chamber 20 and this chamber extends up into the hollow portion 21 of the plug 14. The lower end of the body is provided with a valve casing generally designated by the numeral 22. This casing is divided by a partition 23 into an inlet chamber 24 and an outlet chamber 25. The pipe 26 threaded into a nipple 27 on the valve casing 22 is adapted to supply fluids to the inner chamber. A pipe 28 carries off the fluids from the outlet chamber 25.

A plug 30 is threaded into an opening as shown at 31 in the partition 23, and this plug is provided with a valve seat 32 at its inner end. It will be noted that the plug is provided with a large pocket 33 opening into the chamber 24 while a reduced orifice 34 leads into the outlet chamber 25.

A passage 36 extends from the outlet chamber 25 through the body and is in communication with a chamber 37. This chamber is connected by a passage 38 with the chamber 20 in the cylinder 11.

A piston generally designated by the numeral 40 has a wide portion 41 and a reduced portion 42. It will be noted that the reduced portion is spaced from the larger portion 41 to provide a chamber 43 in the cylinder 11 and between the two portions 41 and 42. A member 44 connects the two portions 41 and 42 and has much less diameter than said portions.

A bore 45 extends longitudinally and centrally of the piston 40 and has radial ports 50 opening into the inlet chamber 24 and reduced radial ports 51 extending from the bore to the chamber 43. A plug 52 is threaded into the larger portion 41 of the piston, and this plug is provided with a reduced passage 53 which connects the bore 45 with the chamber 20.

A pilot valve 55 is adapted to engage a seat 56 at the upper end of a plug 57 which is threaded into the passage 36. This plug is provided with a reduced bore 58 which connects the chamber 37 with the passage 36.

A metal follower 60 is provided with a plurality of longitudinal grooves 61 at its surface and this follower is suspended by a rod or pin 62 from a laminated core 63. The lower end of the follower is provided with a projection 64 which is received by a pocket 65 formed in the valve 55 and pin 66 connects the valve to the projection 64 when it is inserted through alined perforations in the valve and in the projection.

The core 63 is slidably mounted in a plug 70 which has a skirt 71 extending down into the chamber 37 and acts to guide the follower 60 in its vertical movement. The plug 70 is provided with an upstanding cylindrical portion 72 which receives the laminated core 63.

A cylindrical casing 73 is supported on the upper end of the cylindrical member 72 and is held in place by a plug 74 neatly fitted within the upper end of the cylindrical portion and secured in place by means of a screw 75.

The outer wall of the cylindrical member 72 is covered with mica and a suitable number of turns of glass insulated wire 76 are wound upon the member 72 and mica is then wrapped around the outer portion of the coil, after which it is inserted within the casing 73. The core consists of a plurality of laminations of soft iron which are secured together as shown at 77 at spaced points. A semi-circular portion is cut away as shown at 78 from the top of the core, leaving a section 79 around which is fitted a semicircular copper ring 80.

It will be noted that the lower end of the core is provided with a pocket 81 which receives an extension 82 on the upper end of the follower 60. Both the extension and the core are provided with alined perforations to receive the pin 62 for securing the follower to the lower end of the core. It will also be noted that since the longitudinal grooves 61 are in communication with the chamber 37, the liquid or fluid from said chamber will enter the grooves 61 and will pass upwardly between the outer walls of laminated core 63 and the inner wall of the cylindrical member 72.

The operation of my device is as follows: Fluids of any kind are supplied by the pipe 26 to the inlet chamber 24 with the valve 50a being closed when said valve is located on the seat 32. The fluids pass through the perforations 50 and into the bore 45 of the piston 40 and this fluid enters through the ports 51 into the annular chamber 43. The fluid also passes through the restricted passage 53 where it will fill the chamber 20 at the outer end of the cylinder 10. At this time the pilot valve 55 is closed or is located on the seat 56 so that no fluids can pass from the chamber 20 through the channel 38 into the discharge passage 36. At this time the pressure builds up in the chamber 20 and since the effective pressure area at the outer end of the piston is greater than the effective pressure area at the inner end of the piston, said piston will be maintained downwardly so that the valve 50a will be seated.

On the other hand, when the follower 60 is raised either manually or automatically, the valve 55 will be raised from its seat 56 so that the pressure in the chamber will be released through the channel 38, thence through the passage 36 to the outlet chamber 25 whereby the differential pressure against the piston will cause the piston to move upwardly and thus open the valve 50a to permit fluids to pass from the inlet chamber 24 to the outlet chamber 25 and thence through the pipe 28.

When the valve 55 is closed pressure will again build up in the chamber 20 and in the annular chamber 43 whence the piston 40 will be lowered. However, due to the fact that the passages 51 are restricted the piston will be lowered slowly so that the valve 50a will not be jammed upon the seat 32. Furthermore, when the fluids from the bore 45 in the piston 40 pass through the restricted passages 51 and 53 the pressure will be built up slowly in the chambers 20 and 43 so that the piston 40 will be gradually lowered.

On the other hand, when the pilot valve 55 is open the differential upward pressure on the piston 40 will not cause the piston to be moved up rapidly, due to the fact that the annular chamber 43 is filled with liquid and there is also liquid in the chamber 20. Since the liquid in the chambers 20 and 43 cannot be discharged immediately the piston will move up slowly and will engage the downwardly projecting fingers 21a on the closure 14 without any detrimental effects to the piston or to the fingers.

While the pilot valve 55 may be operated manually nevertheless said valve is automatically controlled by a solenoid which has a core 63 that is raised when current flows through the coil 76 in the solenoid. Wires 90 are adapted to be connected to a thermostat or other suitable electrical instrument not shown, and this thermostat is adapted to be placed in a tank for making electrical contact when the temperature of a liquid rises to a predetermined degree. Current flowing through the coil 76 energizes the solenoid, thereby creating force on the laminated core 63 tending to centralize the same in the magnetic field.

Parts are so positioned with respect to each other that this force will move the core 63 which carries the follower 60 and likewise the valve 55 away from the seat 56. When the circuit is broken the coil is deenergized, permitting the valve 55 to again seat by gravity. Furthermore, there is a force which tends to draw the valve 55 toward its seat 56, and this force is caused by the drop in pressure in the chamber 37 and in the discharge passage 36.

It will be particularly noted that the wires forming the coil 76 are glass-insulated and therefore they are capable of withstanding high temperatures and are also impervious to moisture. This is particularly important, due to the fact that the fluids can pass up through the grooves 61 and around the laminated core 63.

It will be noted that the plug 14 has a greater diameter than that section of the cylinder 10 which has the greater diameter. Thus when the plug 14 is removed the entire piston assemblage may be lifted directly from the cylinder 10 as will be the valve 50a. Furthermore, the removal of the plug 70 from the upper threaded end of the chamber 37 will also cause removal of the solenoid, the core and follower 60, together with the pilot valve 55, because all of these elements are slidably mounted within the cylindrical extensions 71 and 72 of the plug 70.

I claim:

In a device of the class described, a valve body having an inlet chamber for liquid, an outlet chamber, a vertically disposed cylinder opening at one end into said inlet chamber and a valve seat opening connecting said chambers, a piston fitted into the cylinder, said piston and cylinder having cooperating sections of different diameters for forming in the cylinder between two sections of the piston an annular chamber in which is adapted to be confined a liquid, a valve in the inlet chamber on one end of the piston for closing the valve seat opening, the other end of the cylinder being closed to form a pressure chamber between said closed end and the wider section of the piston, said piston having an axial bore opening at one end into the pressure chamber, ports above the valve connecting the other end of the bore with the inlet chamber and ports connecting said bore with the annular chamber, said body having an auxiliary discharge passage connecting the pressure chamber with the outlet chamber, and a valve, automatically operated and controlling the flow of liquid through the discharge passage to release the liquid from the pressure chamber for causing opening of the first valve, the piston sections of different diameters being so disposed relative to similar sections of the cylinder that when the piston moves the first valve towards its seat said annular chamber will be decreased diametrically for aiding in restraining the downward movement of said valve.

VAN KING ROBINSON.